(12) United States Patent
Howard et al.

(10) Patent No.: US 8,543,070 B2
(45) Date of Patent: Sep. 24, 2013

(54) REDUCED COMPLEXITY BEAM-STEERED MIMO OFDM SYSTEM

(75) Inventors: Steven J. Howard, Ashland, MA (US);
John W. Ketchum, Harvard, MA (US);
Mark S. Wallace, Bedford, MA (US);
Jay Rodney Walton, Carlisle, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1891 days.

(21) Appl. No.: 11/481,705

(22) Filed: Jul. 5, 2006

(65) Prior Publication Data
US 2007/0249296 A1 Oct. 25, 2007

Related U.S. Application Data

(60) Provisional application No. 60/794,615, filed on Apr. 24, 2006.

(51) Int. Cl.
*H03C 7/02* (2006.01)
*H04M 1/00* (2006.01)
*H04B 1/00* (2006.01)
*H04B 7/208* (2006.01)
*H04B 15/00* (2006.01)

(52) U.S. Cl.
USPC .......... 455/101; 455/562.1; 455/69; 370/344; 375/285

(58) Field of Classification Search
USPC .......... 455/101, 562.1, 69; 370/344; 375/285
See application file for complete search history.

(56) References Cited

U.S. PATENT DOCUMENTS

| 5,581,583 A | 12/1996 | Conti et al. |
| 5,668,837 A | 9/1997 | Dent |
| 5,757,845 A | 5/1998 | Fukawa et al. |
| 6,061,023 A | 5/2000 | Daniel et al. |
| 6,118,758 A | 9/2000 | Marchok et al. |

(Continued)

FOREIGN PATENT DOCUMENTS

| CA | 2490520 A1 | 12/2003 |
| CA | 2510840 A1 | 7/2004 |

(Continued)

OTHER PUBLICATIONS

Bello: "Characterization of Randomly Time-Variante Linear Channels," Communications Systems, IEEE transactions on, vol. 11, Issue 4, pp. 360-393, Dec. 1963.

(Continued)

*Primary Examiner* — Ariel Balaoing
(74) *Attorney, Agent, or Firm* — QUALCOMM IP Department; James Hunt Yancey, Jr.

(57) ABSTRACT

Techniques for transmitting data using channel information for a subset of all subcarriers used for data transmission are described. A transmitter station receives channel information for at least one subcarrier that is a subset of multiple subcarriers used for data transmission. The channel information may include at least one transmit steering matrix, at least one set of eigenvectors, at least one channel response matrix, at least one channel covariance matrix, an unsteered pilot, or a steered pilot for the at least one subcarrier. The transmitter station obtains at least one transmit steering matrix for the at least one subcarrier from the channel information and determines a transmit steering matrix for each of the multiple subcarriers. The transmitter station performs transmit steering or beam-steering for each of the multiple subcarriers with the transmit steering matrix for that subcarrier.

14 Claims, 6 Drawing Sheets

(56) References Cited

U.S. PATENT DOCUMENTS

| | | | |
|---|---|---|---|
| 6,144,711 | A | 11/2000 | Raleigh et al. |
| 6,175,743 | B1 | 1/2001 | Alperovich et al. |
| 6,198,775 | B1 | 3/2001 | Khayrallah et al. |
| 6,218,985 | B1 | 4/2001 | Adams |
| 6,298,035 | B1 | 10/2001 | Heiskala |
| 6,314,147 | B1 | 11/2001 | Liang et al. |
| 6,351,499 | B1 | 2/2002 | Paulraj et al. |
| 6,441,786 | B1 | 8/2002 | Jasper et al. |
| 6,452,981 | B1 | 9/2002 | Raleigh et al. |
| 6,473,467 | B1 * | 10/2002 | Wallace et al. ............... 375/267 |
| 6,477,161 | B1 | 11/2002 | Hudson et al. |
| 6,486,828 | B1 | 11/2002 | Cahn et al. |
| 6,496,535 | B2 | 12/2002 | Xu |
| 6,542,556 | B1 | 4/2003 | Kuchi et al. |
| 6,618,454 | B1 | 9/2003 | Agrawal et al. |
| 6,636,568 | B2 | 10/2003 | Kadous |
| 6,642,888 | B2 | 11/2003 | Kishigami et al. |
| 6,678,263 | B1 | 1/2004 | Hammons, Jr. et al. |
| 6,711,124 | B2 | 3/2004 | Khayrallah et al. |
| 6,711,528 | B2 | 3/2004 | Dishman et al. |
| 6,760,388 | B2 | 7/2004 | Ketchum et al. |
| 6,763,073 | B2 | 7/2004 | Foschini et al. |
| 6,788,661 | B1 | 9/2004 | Ylitalo et al. |
| 6,801,790 | B2 | 10/2004 | Rudrapatna |
| 6,804,307 | B1 | 10/2004 | Popovic |
| 6,810,506 | B1 | 10/2004 | Levy |
| 6,816,555 | B2 | 11/2004 | Sakoda |
| 6,842,487 | B1 | 1/2005 | Larsson |
| 6,847,306 | B2 | 1/2005 | Diba et al. |
| 6,859,747 | B2 | 2/2005 | Yutkowitz |
| 6,862,271 | B2 | 3/2005 | Medvedev et al. |
| 6,873,606 | B2 | 3/2005 | Agrawal et al. |
| 6,937,189 | B2 | 8/2005 | Kim |
| 6,940,917 | B2 | 9/2005 | Menon et al. |
| 6,952,454 | B1 | 10/2005 | Jalali et al. |
| 6,956,897 | B1 | 10/2005 | Honig |
| 6,975,668 | B2 | 12/2005 | Zhang |
| 6,982,946 | B2 | 1/2006 | Wiberg et al. |
| 6,999,472 | B2 | 2/2006 | Hamalainen et al. |
| 7,020,110 | B2 | 3/2006 | Walton et al. |
| 7,031,669 | B2 | 4/2006 | Vaidyanathan et al. |
| 7,057,555 | B2 | 6/2006 | Lewis |
| 7,061,969 | B2 | 6/2006 | Alamouti et al. |
| 7,065,144 | B2 | 6/2006 | Walton et al. |
| 7,065,156 | B1 | 6/2006 | Kuchi |
| 7,079,870 | B2 | 7/2006 | Vaidyanathan |
| 7,092,737 | B2 | 8/2006 | Horng et al. |
| 7,095,709 | B2 | 8/2006 | Walton et al. |
| 7,095,987 | B2 | 8/2006 | Brothers, Jr. et al. |
| 7,099,678 | B2 | 8/2006 | Vaidyanathan |
| 7,099,698 | B2 | 8/2006 | Tarokh et al. |
| 7,110,350 | B2 | 9/2006 | Li et al. |
| 7,110,378 | B2 | 9/2006 | Onggosanusi et al. |
| 7,110,463 | B2 | 9/2006 | Wallace et al. |
| 7,116,723 | B2 | 10/2006 | Kim et al. |
| 7,130,580 | B2 | 10/2006 | Alexiou et al. |
| 7,149,254 | B2 | 12/2006 | Sampath |
| 7,151,806 | B2 | 12/2006 | Hosoda et al. |
| 7,151,809 | B2 | 12/2006 | Ketchum et al. |
| 7,190,734 | B2 | 3/2007 | Giannakis et al. |
| 7,194,042 | B2 | 3/2007 | Walton et al. |
| 7,200,631 | B2 | 4/2007 | Mailaender et al. |
| 7,206,354 | B2 | 4/2007 | Wallace et al. |
| 7,227,906 | B2 | 6/2007 | Fukuda et al. |
| 7,236,478 | B2 | 6/2007 | Wu et al. |
| 7,292,623 | B2 | 11/2007 | Reznik |
| 7,298,805 | B2 | 11/2007 | Walton et al. |
| 7,301,924 | B1 | 11/2007 | Gurbuz et al. |
| 7,302,009 | B2 | 11/2007 | Walton et al. |
| 7,317,750 | B2 | 1/2008 | Shattil |
| 7,324,429 | B2 | 1/2008 | Walton et al. |
| 7,324,482 | B2 | 1/2008 | Hammons, Jr. et al. |
| 7,327,795 | B2 | 2/2008 | Oprea |
| 7,327,798 | B2 | 2/2008 | Won |
| 7,327,800 | B2 | 2/2008 | Oprea et al. |
| 7,336,746 | B2 | 2/2008 | Walton et al. |
| 7,356,073 | B2 | 4/2008 | Heikkila |
| 7,359,466 | B2 | 4/2008 | Huang et al. |
| 7,385,617 | B2 | 6/2008 | Tahat |
| 7,394,754 | B2 | 7/2008 | Li et al. |
| 7,436,896 | B2 | 10/2008 | Hottinen et al. |
| 7,447,268 | B2 | 11/2008 | Sadowsky et al. |
| 7,522,673 | B2 | 4/2009 | Giannakis et al. |
| 7,529,177 | B2 | 5/2009 | Celebi et al. |
| 7,555,053 | B2 | 6/2009 | Trachewsky et al. |
| 7,583,747 | B1 | 9/2009 | Damen et al. |
| 7,593,317 | B2 | 9/2009 | Yuda et al. |
| 7,653,142 | B2 | 1/2010 | Ketchum et al. |
| 7,742,546 | B2 | 6/2010 | Ketchum et al. |
| 7,787,554 | B1 | 8/2010 | Nabar et al. |
| 7,974,359 | B2 | 7/2011 | Gorokhov et al. |
| 8,290,089 | B2 | 10/2012 | Howard et al. |
| 8,325,844 | B2 | 12/2012 | Walton et al. |
| 2001/0053124 | A1 | 12/2001 | Ichihara et al. |
| 2002/0009125 | A1 | 1/2002 | Shi |
| 2002/0091943 | A1 | 7/2002 | Lau |
| 2002/0102940 | A1 | 8/2002 | Bohnke et al. |
| 2002/0127978 | A1 * | 9/2002 | Khatri ........................... 455/103 |
| 2002/0193146 | A1 | 12/2002 | Wallace et al. |
| 2002/0196742 | A1 | 12/2002 | Baker et al. |
| 2003/0011274 | A1 | 1/2003 | Saint-Michel et al. |
| 2003/0026349 | A1 | 2/2003 | Onggosanusi et al. |
| 2003/0072254 | A1 | 4/2003 | Ma et al. |
| 2003/0112745 | A1 | 6/2003 | Zhuang et al. |
| 2003/0123567 | A1 | 7/2003 | Shigemasa et al. |
| 2003/0181211 | A1 | 9/2003 | Razavilar et al. |
| 2003/0186698 | A1 | 10/2003 | Holma et al. |
| 2003/0189999 | A1 | 10/2003 | Kadous |
| 2003/0228850 | A1 | 12/2003 | Hwang |
| 2003/0235147 | A1 | 12/2003 | Walton et al. |
| 2003/0235238 | A1 | 12/2003 | Schelm et al. |
| 2003/0235255 | A1 * | 12/2003 | Ketchum et al. ............... 375/285 |
| 2004/0002364 | A1 | 1/2004 | Trikkonen et al. |
| 2004/0052315 | A1 | 3/2004 | Thielecke et al. |
| 2004/0066773 | A1 | 4/2004 | Sun et al. |
| 2004/0081263 | A1 | 4/2004 | Lee et al. |
| 2004/0082356 | A1 | 4/2004 | Walton et al. |
| 2004/0085939 | A1 | 5/2004 | Wallace et al. |
| 2004/0136349 | A1 | 7/2004 | Walton et al. |
| 2004/0157645 | A1 | 8/2004 | Smith et al. |
| 2004/0165675 | A1 | 8/2004 | Ito et al. |
| 2004/0190639 | A1 | 9/2004 | Pauli et al. |
| 2004/0203473 | A1 | 10/2004 | Liu |
| 2005/0017511 | A1 | 1/2005 | Dalton |
| 2005/0026570 | A1 | 2/2005 | Han |
| 2005/0149320 | A1 | 7/2005 | Kajala et al. |
| 2005/0175115 | A1 | 8/2005 | Walton et al. |
| 2005/0180312 | A1 * | 8/2005 | Walton et al. ................. 370/208 |
| 2005/0195733 | A1 | 9/2005 | Walton et al. |
| 2005/0238111 | A1 | 10/2005 | Wallace et al. |
| 2005/0249159 | A1 | 11/2005 | Abraham et al. |
| 2005/0249174 | A1 | 11/2005 | Lundby et al. |
| 2005/0265275 | A1 | 12/2005 | Howard et al. |
| 2005/0267925 | A1 | 12/2005 | Clue |
| 2005/0276347 | A1 | 12/2005 | Mujtaba et al. |
| 2006/0013250 | A1 | 1/2006 | Howard et al. |
| 2006/0050770 | A1 | 3/2006 | Wallace et al. |
| 2006/0056531 | A1 | 3/2006 | Li et al. |
| 2006/0067277 | A1 | 3/2006 | Thomas et al. |
| 2006/0067421 | A1 | 3/2006 | Walton et al. |
| 2006/0068718 | A1 | 3/2006 | Li et al. |
| 2006/0106902 | A1 | 5/2006 | Howard et al. |
| 2006/0155798 | A1 | 7/2006 | Ketchum et al. |
| 2006/0234789 | A1 | 10/2006 | Tarokh et al. |
| 2006/0274844 | A1 | 12/2006 | Walton et al. |
| 2006/0285531 | A1 | 12/2006 | Howard et al. |
| 2007/0009059 | A1 | 1/2007 | Wallace et al. |
| 2007/0217538 | A1 | 9/2007 | Waxman |
| 2008/0031372 | A1 | 2/2008 | Walton et al. |
| 2008/0031374 | A1 | 2/2008 | Walton et al. |
| 2008/0095121 | A1 | 4/2008 | Shattil |
| 2008/0095282 | A1 | 4/2008 | Walton et al. |
| 2008/0273617 | A1 | 11/2008 | Lundby et al. |
| 2009/0290657 | A1 | 11/2009 | Howard et al. |

| | | | |
|---|---|---|---|
| 2010/0074301 | A1 | 3/2010 | Howard et al. |
| 2010/0169396 | A1 | 7/2010 | Howard et al. |
| 2011/0142097 | A1 | 6/2011 | Walton et al. |
| 2012/0213181 | A1 | 8/2012 | Walton et al. |
| 2012/0250788 | A1 | 10/2012 | Walton et al. |

FOREIGN PATENT DOCUMENTS

| | | | |
|---|---|---|---|
| CN | 1476695 A | | 2/2004 |
| CN | 1592144 A | | 3/2005 |
| EP | 0091999 A1 | | 10/1983 |
| EP | 0752793 A2 | | 1/1997 |
| EP | 0905920 A2 | | 3/1999 |
| EP | 1009124 A2 | | 6/2000 |
| EP | 1073214 A1 | | 1/2001 |
| EP | 1185001 | | 3/2002 |
| EP | 1220506 A1 | | 7/2002 |
| EP | 1223702 A1 | | 7/2002 |
| EP | 1241824 | | 9/2002 |
| EP | 1353452 A2 | | 10/2003 |
| EP | 1361686 | | 11/2003 |
| EP | 1396956 A1 | | 3/2004 |
| JP | 11163822 A | | 6/1999 |
| JP | 11205026 A | | 7/1999 |
| JP | 2001237751 A | | 8/2001 |
| JP | 2002503048 T | | 1/2002 |
| JP | 2002524972 | | 8/2002 |
| JP | 2003530010 | | 10/2003 |
| JP | 2004023416 A | | 1/2004 |
| JP | 2004064654 A | | 2/2004 |
| JP | 2004072150 A | | 3/2004 |
| JP | 2004096753 A | | 3/2004 |
| JP | 2004509556 A | | 3/2004 |
| JP | 2004104790 A | | 4/2004 |
| JP | 2005524331 T | | 8/2005 |
| JP | 2007504188 A | | 3/2007 |
| JP | 2007515131 | | 6/2007 |
| JP | 2007515829 T | | 6/2007 |
| JP | 2007523549 T | | 8/2007 |
| JP | 2007523550 T | | 8/2007 |
| JP | 2007527150 | | 9/2007 |
| JP | 2007529972 T | | 10/2007 |
| JP | 2007538414 T | | 12/2007 |
| KR | 200260860 | | 7/2002 |
| KR | 20040061023 A | | 7/2004 |
| KR | 20040089748 | | 10/2004 |
| KR | 20060123496 | | 12/2006 |
| RU | 2103768 C1 | | 1/1998 |
| RU | 2111619 | | 5/1998 |
| RU | 2116698 C1 | | 7/1998 |
| RU | 2202152 | | 4/2003 |
| RU | 2238611 C1 | | 10/2004 |
| RU | 2005115862 | | 1/2006 |
| RU | 2292116 | | 1/2007 |
| TW | 341680 | | 10/1998 |
| TW | 350047 | | 1/1999 |
| TW | 466385 B | | 12/2001 |
| TW | 508960 | | 11/2002 |
| TW | 510103 B | | 11/2002 |
| TW | 512602 | | 12/2002 |
| TW | 200304287 | | 9/2003 |
| WO | WO9737456 A2 | | 10/1997 |
| WO | 0014921 A1 | | 3/2000 |
| WO | 0044144 A1 | | 7/2000 |
| WO | WO0156218 A1 | | 8/2001 |
| WO | WO0176110 A2 | | 10/2001 |
| WO | 0219565 A2 | | 3/2002 |
| WO | WO0225857 A1 | | 3/2002 |
| WO | WO02078211 A2 | | 10/2002 |
| WO | WO02093784 A1 | | 11/2002 |
| WO | WO03015334 | | 2/2003 |
| WO | WO03041300 | | 5/2003 |
| WO | WO03050968 | | 6/2003 |
| WO | WO03056742 A1 | | 7/2003 |
| WO | WO03058871 A1 | | 7/2003 |
| WO | WO03063526 A1 | | 7/2003 |
| WO | WO03071711 | | 8/2003 |
| WO | WO03094386 A1 | | 11/2003 |
| WO | WO03101029 A1 | | 12/2003 |
| WO | WO04002011 | | 12/2003 |
| WO | WO04002047 | | 12/2003 |
| WO | WO2004021605 A1 | | 3/2004 |
| WO | W2004043082 A2 | | 5/2004 |
| WO | WO2004038984 A2 | | 5/2004 |
| WO | WO2004038985 A2 | | 5/2004 |
| WO | WO2004038987 | | 5/2004 |
| WO | WO2004039011 | | 5/2004 |
| WO | WO2004054191 | | 6/2004 |
| WO | WO2005060144 | | 6/2005 |
| WO | WO2005060192 A1 | | 6/2005 |
| WO | WO2005088882 A1 | | 9/2005 |
| WO | WO2005099211 A1 | | 10/2005 |
| WO | 2005114868 | | 12/2005 |
| WO | WO2006053340 A2 | | 5/2006 |

OTHER PUBLICATIONS

Choi, et al.: "Interpolation Based Transmit Beamforming for MIMO-OFDM with Limited Feedback," 2004 IEEE International Conference in Paris, France, pp. 249-253, Jun. 20, 2004.

Giacomantone, Javier Oscar, "Tradeoffs in Arithmetic Architectures for CORDIC Algorithm Design." CeTAD—Fac. De Ingenieria—UNLP.

Gotze, J., et al., "An Algorithm and Architecture Based on Orthonormal Mu-Rotations for Computing the Symmetric EVD" Integration, The VLSI Journal, North-Holland Publishing Company. Amsterdam, NL, vol. 20, No. 1, Dec. 1, 1995, pp. 21-39.

Griffin, Grant R., "Cordic FAQ," Iowegian's dspGuru. pp. 1-6.

Hemkumar N. D., et al. "Efficient Complex Matrix Transformations with CORDIC" Computer Arithmetic, 1994. Proceedings., 11th Symposium on Windsor, Ont., Canada Jun. 29-Jul. 2, 1993, Los Alamitos, CA, USA, IEEE Comput. Soc, Jun. 29, 1993, pp. 1.

Kim, et al.: "Design of Jacobi EVD Processor Based on CORDIC for DOA Estimation with MUSIC Algorithm." Personal, Indoor, and Mobile Radio Communications, 2002. The 13th IEEE International Symposium on Sep. 15-18, 2002, Piscataway, NJ, USA, IEEE.

Nowak, et al.. "An Efficient Implementation of a 256-point FFT Processor with CORDIC for OFDM Systems," Delft University of Technology, Faculty of Information Technology and Systems Circuits and Systems Group. ISBN: 90-73461-15-4. 1998. STW, 1998 1026-01.

Shen-Fu Hsiao, et al.: "Parallel Singular Value Decomposition of Complex Matrices Using Multidimensional CORDIC Algorithms" IEEE Transactions os Signal Processing, IEEE Service Center; New York, NY, UA, vol. 44, No. 3, Mar. 1, 1996.

International Search Report—PCT/US2007/067323, International Search Authority—European Patent Office—Sep. 11, 2007.

Written Opinion—PCT/US2007/067323, International Search Authority—European Patent Office—Sep. 11, 2007.

Michalke C et al: Efficient tracking of eigenspaces and its application to eigenbeanforming Personal, Indoor and Mobile Radio Communications 14th IEEE Proceedings, Sep. 7, 2003, pp. 2847-2851, Sections II.B and III.C, pp. 2847-2851, XP010678152.

Oksa G et al: "Multi-level parallelism in the block-jacobi SVD algorithm" Parallel and Distribution Processing, 2001. Proceedings. Ninth Euromicr O Workshop. IEEE, Feb. 7, 2001, pp. 306-313, XP010532138, ISBN: 978-0-7695-0987-7.

Schafer F., et al.: "Efficient Tracking of Eigenspaces and its application to MIMO systems" Proceedings of the IST Mobile and Wireless Communications Summit, Jun. 18, 2003, pp. 1-6, XP002478514.

Seeger, R. et al.: "Advanced Eigenbeamforming for the 3GPP UMTS FDD Downlink" ITG IEEE Workshop on Smart Antennas, XX, XX, Apr. 4, 2004, pp. 1-8, XP002468805, Section III.

Taiwan Search Report—TW096114238—TIPO—Apr. 12, 2011.

Agustin A et al: "LDC Construction with a Defined Structure [MIMO Linear Dispersive Codes]" Vehicular Technology Confernece, 2003. VTC 2003—Fall. 2003 IEEE 58th Orlando, FL, USA Oct. 6-9, 2003, Piscataway NJ, USA, IEEE, US, Oct. 6, 2003, pp. 433-437 vol. 1. XP010700754 ISBN:0-7803-7954-3.

Alamouti, S.M., "A Simple Transmit Diversity Technique for Wireless Communications," IEEE Journal on Select Areas in Communications, vol. 16, No. 8, Oct. 1998, pp. 1451-1458.

Antenna-Theory.com, "Steering Vector", http://www.antenna-theory.com, pp. 1., No date given.

Auer, G., "Channel Estimation for OFDM With Cyclic Delay Diversity," Personal, Indoor and Mobile Radio Communications, 2004. PIMRC 2004, 15th IEEE International Symposium on September 5, 2004, vol. 3, pp. 1792-1796.

Bauch, et al., "Orthogonal Frequency Division Multiple Access with Cyclic Delay Diversity," ITG Workshop on Smart Antennas, Munich Germany, Mar. 18-19, 2004, pp. 17-24.

Bem et al., "Smart Antennas for Mobile Communications Systems," International Conference on Microwaves, Radar and Wireless Communications, vol. 3, May 22, 2000, pp. 120-130, XP010537479.

Bourdoux et al., "Non-reciprocal transceivers in OFDM/SDMA Systems: Impact and Mitigation," Radio and Wireless Conference, Aug. 10, 2003, pp. 183-186, XP010656728.

Branka et al., "Performance Limits of Multiple-Input Multiple-Output Wireless Communication Systems", Space-Time Coding, John Wiley& Sons. Ltd, Apr. 2003, England, pp. 1-9.

Bruhl et al., "Investigation of Front-end Requirements for MIMO-Systems Using Downlink Pre-Distortion," European Personal Mobile Communications Conference, 2003, pp. 472-476, XP002330243.

Crow, "The Fourier Matrix", Apr. 27, 2001, http://www.maths.abdn.ac.uk/~igc/tch/mx4002/notes/node91.html, pp. 1-3.

Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.

Doonstnejad et al, "Space-time Spreading Codes for a Multiuser MIMO System," Institute of Electrical and Electronics Engineers, Conference Record of the 36th. Asilomar Conference on Signals, Systems, & Computers, Pacific Grove, California, Nov. 3-6, 2002, pp. 1374-1378, XP10638423.

Farrokhi et al., "Link-Optimal Space-Time Processing with Multiple Transmit and Receive Antennas," IEEE Communications Letters, vol. 5, No. 3, pp. 85-87(Mar. 2001).

Goldsmith, Andrea et al., "Capacity Limits of MIMO Channels," IEEE Journal on Selected Areas in Communications, vol. 21, No. 5, pp. 684-702, Jun. 2003.

Hanzo et al., Single and Multi-Carrier Ds-CDMA, "Space-Time Spreading Aided Single-Carrier Wideband CDMA Communicating Over Multipath Nakagami Fading Channels," Chapter 8, pp. 279-310, John Wiley & Sons, England, 2003 (XP-002357231).

Hochwald et al., "A Transmitter Diversity Scheme for Wideband CDMA Systems based on Space-time Spreading", Selected Areas in Communications, vol. 19, No. 1, Jan. 2001.

Hochwald, et al., "Systematic Design of Unitary Space-Time Constellations," IEEE Transactons on Information Theory, 2000, 46 (6), 1962-1973.

Hochwald et al., "Unitary Space-Time Modulation for Multiple-Antenna Communications in Rayleigh Flat Fading," IEEE Transactions on Information Theory, vol. 46, No. 2, pp. 543-564 (2000).

IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.

IEEE Std. 802.11g IEEE Standard for Information technology—Telecommunications and information exchange between systems—Local and metropolitan area networks—Specific requirements—Part 11: Wireless LAN Medium Access Control (MAC) and Physical Layer (PHY) Specifications, Amendment 4: Further Higher Data Rate Extension in the 2.4 GHz Band, LAN/MAN Standards Committee IEEE Computer Society Jun. 27, 2003, pp. i-x & 1-67.

Jungnickel et al., "A Mimo System with Reciprocal Transceivers for the Time-division Duplex Mode," Antennas and Propagation Society International Symposium, vol. 2, Jun. 20, 2004, pp. 1267-1270, XP010721570.

Kaiser, "Spatial Transmit Diversity Techniques for Broadband OFDM Systems," IEEE Global Telecommunications Conference, 2000. GLOBECOM '00. San Francisco, CA, Nov. 27-Dec. 1, 2000, vol. 3, pp. 1824-1828, XP001195742.

Ketchum, John, et al., "PHY Design for Spatial Multiplexing MIMO WLAN," IEEE 802.11-04/0721r0, IEEE, Jul. 2004, pp. 1-33 (Spatial Spreading Mode, Intrinsic Transmission Mode).

Laroia R et al., "Enhanced Opportunistic Beamforming," Vehicular Technology Conference, 2003. VTC 2003—Fall. IEEE 58th Orlando, FL, USA Oct. 6-9, 2003, pp. 1762-1766, XP010702878.

Li, et al., "Transmit Diversity Over Quasi-Static Fading Channels Using Multiple Antennas and Random Signal Mapping," IEEE Transactions on Communications, vol. 51, No. 11, Nov. 2003, pp. 1918-1926.

Liu et al., "OFDM-MIMO WLAN AP Front-end Gain and Phase Mismatch Calibration," IEEE Radio and Wireless Conference, Sep. 2004, pp. 151-154, XP002330244.

Liu, Jung-Tao: "Successive decoding of multiple space time coded streams in multi-input multi-output systems," Global Telecommunications Conference, 2002. Globecom '02. IEEE, USA, Nov. 21, 2002, 1007-1011 vol. 1.

Medles et al., "Multistream Space-Time Coding by Spatial Spreading, Scrambling and Delay Diversity," IEEE International Conference on Acoustics, Speech and Signal Processing, vol. 4 of 4, XP-10803892, pp. 2429-2432 (2002).

Narula, et al., "Performance Limits of Coded Diversity Methods for Transmitter Antenna Arrays," IEEE Transactions on Information Theory, vol. 45, No. 7, Nov. 1999, pp. 2418-2433.

Pan, et al., "Dynamic Sub-channel Allocation with Adaptive Beamforming for Broadband OFDM Wireless Systems," IEEE Global Telecommunications Conference, 2002. GLOBECOM '02. Taipei, Taiwan, Nov. 17-21, 2002, New York, NY, Nov. 17, 2002, vol. 1, pp. 711-715.

Sharif et al., "On the Capacity of MIMO Broadcast Channel with Partial Side Information", Department of Electrical Engineering, CA Institute of Engineering, IEEE 2002, pp. 958-962.

Suthaharan, et al., Space-time coded MIMO-OFDM for high capacity and high data-rate wireless communication over frequency selective fading channels, Mobile and Wireless Communications Networks, 2002. 4th International Workshop on, USA, Sep. 11, 2002, 424-428.

Taiwan Search Report—TW094130237—TIPO—Oct. 3, 2011.

T.L. Marzetta, B. Hassibi, B.M Hochwald, "Structured Unitary Space-Time Autocoding Constellations,"IEEE Trans. on it,vol. 48, No. 4, Apr. 2002.

Winters, J. "Smart antennas for wireless systems", IEEE Personal Communications, Dec. 5, 2003, pp. 1-113.

Yao, Huan, "Efficient Signal, Code, and Receiver Designs for MIMO Communication Systems," Ph.D. Thesis, Massachusetts Institute of Technology, Cambridge, Massachusetts, May 21, 2003, 205 pages.

Yu and Cioffi, "Trellis Precoding for the Broadcas Channel," IEEE Global Telecommunications Conference, vol. 2, Electrical Engineering Department, Stanford, University, Stanford, California (2001), pp. 1344-1348.

* cited by examiner

US 8,543,070 B2

REDUCED COMPLEXITY BEAM-STEERED MIMO OFDM SYSTEM

CLAIM OF PRIORITY UNDER 35 U.S.C. §119

The present application for patent claims priority to Provisional Application No. 60/794,615 entitled "REDUCED COMPLEXITY STEERED MIMO OFDM SYSTEMS" filed Apr. 24, 2006, and assigned to the assignee hereof and hereby expressly incorporated by reference herein.

BACKGROUND

I. Field

The present disclosure relates generally to communication, and more specifically to techniques for transmitting data in a multiple-input multiple-output (MIMO) system.

II. Background

In a wireless communication system, a transmitter may utilize multiple (T) transmit antennas for data transmission to a receiver equipped with multiple (R) receive antennas. The multiple transmit and receive antennas form a MIMO channel that may be used to increase throughput and/or improve reliability. For example, the transmitter may transmit up to T data streams simultaneously from the T transmit antennas to improve throughput. Alternatively, the transmitter may transmit a single data stream from all T transmit antennas to improve reception by the receiver.

Good performance (e.g., high throughput) may be achieved by transmitting data on the eigenmodes of the MIMO channel. The eigenmodes may be viewed as orthogonal spatial channels. To transmit data on the eigenmodes, the transmitter obtains a transmit steering matrix, which is derived based on a MIMO channel response matrix, and performs spatial processing with the transmit steering matrix.

The system may have multiple subcarriers that may be used for data transmission. To transmit data on the eigenmodes of each of the subcarriers, the transmitter may obtain a transmit steering matrix for each subcarrier and perform spatial processing for that subcarrier with the transmit steering matrix. However, deriving the transmit steering matrix for each subcarrier may require significant computational resources at the transmitter and/or receiver. Furthermore, a significant amount of radio resources may be needed to send the transmit steering matrices, or pilot signals used to derive the transmit steering matrices, from the receiver to the transmitter.

There is therefore a need in the art for techniques to transmit data with less computation and feedback overhead.

SUMMARY

Techniques for transmitting data using channel information for a subset of all subcarriers used for data transmission are described herein. The techniques may provide good performance while reducing computation and feedback overhead.

In an embodiment, a transmitter station receives channel information for at least one subcarrier that is a subset of multiple subcarriers used for data transmission. The channel information may comprise at least one transmit steering matrix, at least one set of eigenvectors, at least one channel response matrix, or at least one channel covariance matrix for the at least one subcarrier. The channel information may also comprise an unsteered pilot or a steered pilot sent on the at least one subcarrier. In any case, the transmitter station obtains at least one transmit steering matrix for the at least one subcarrier from the channel information. The transmitter station determines a transmit steering matrix for each of the multiple subcarriers, which may be (1) set equal to the transmit steering matrix for the closest one of the at least one subcarrier or (2) derived by interpolating two or more transmit steering matrices for two or more closest subcarriers. The transmitter station performs transmit steering or beam-steering for each of the multiple subcarriers with the transmit steering matrix for that subcarrier.

In an embodiment, a receiver station sends channel information for the at least one subcarrier to the transmitter station and receives the data transmission sent on the multiple subcarriers. The receiver station may obtain at least one channel response matrix for the at least one subcarrier and decompose the at least one channel response matrix to obtain at least one transmit steering matrix, e.g., V(k) and/or U(k), which are described below. The receiver may send at least one transmit steering matrix V(k) as explicit feedback. The receiver station may also send a steered pilot on the at least one subcarrier using at least one transmit steering matrix U(k). The steered pilot is one form of implicit feedback. The receiver station determines transmit steering matrices for the multiple subcarriers based on the at least one transmit steering matrix in the same manner as the transmitter station. The receiver station derives spatial filter matrices for the multiple subcarriers based on the channel response matrices and the transmit steering matrices for these subcarriers. The receiver station then performs detection with the spatial filter matrices.

Various aspects and embodiments of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The transmission techniques described herein may be used for various wireless communication networks such as wireless wide area networks (WWANs), wireless metropolitan area networks (WMANs), wireless local area networks (WLANs), and so on. The terms "network" and "system" are often used interchangeably. The techniques may also be used for various multiple access schemes such as Frequency Division Multiple Access (FDMA), Code Division Multiple Access (CDMA), Time Division Multiple Access (TDMA), Spatial Division Multiple Access (SDMA), Orthogonal FDMA (OFDMA), Single-Carrier FDMA (SC-FDMA), and so on. An OFDMA network utilizes Orthogonal Frequency Division Multiplexing (OFDM). An SC-FDMA network utilizes Single-Carrier Frequency Division Multiplexing (SC-FDM). OFDM and SC-FDM partition the system bandwidth into multiple (K) orthogonal subcarriers, which are also called tones, bins, and so on. Each subcarrier may be modulated with data. In general, modulation symbols are sent in the frequency domain with OFDM and in the time domain with SC-FDM. For clarity, the transmission techniques are described below for an OFDM-based network, which may be an OFDMA network, a WLAN that implements IEEE 802.11a, 802.11g and/or 802.11n, or some other network.

Figure 1:
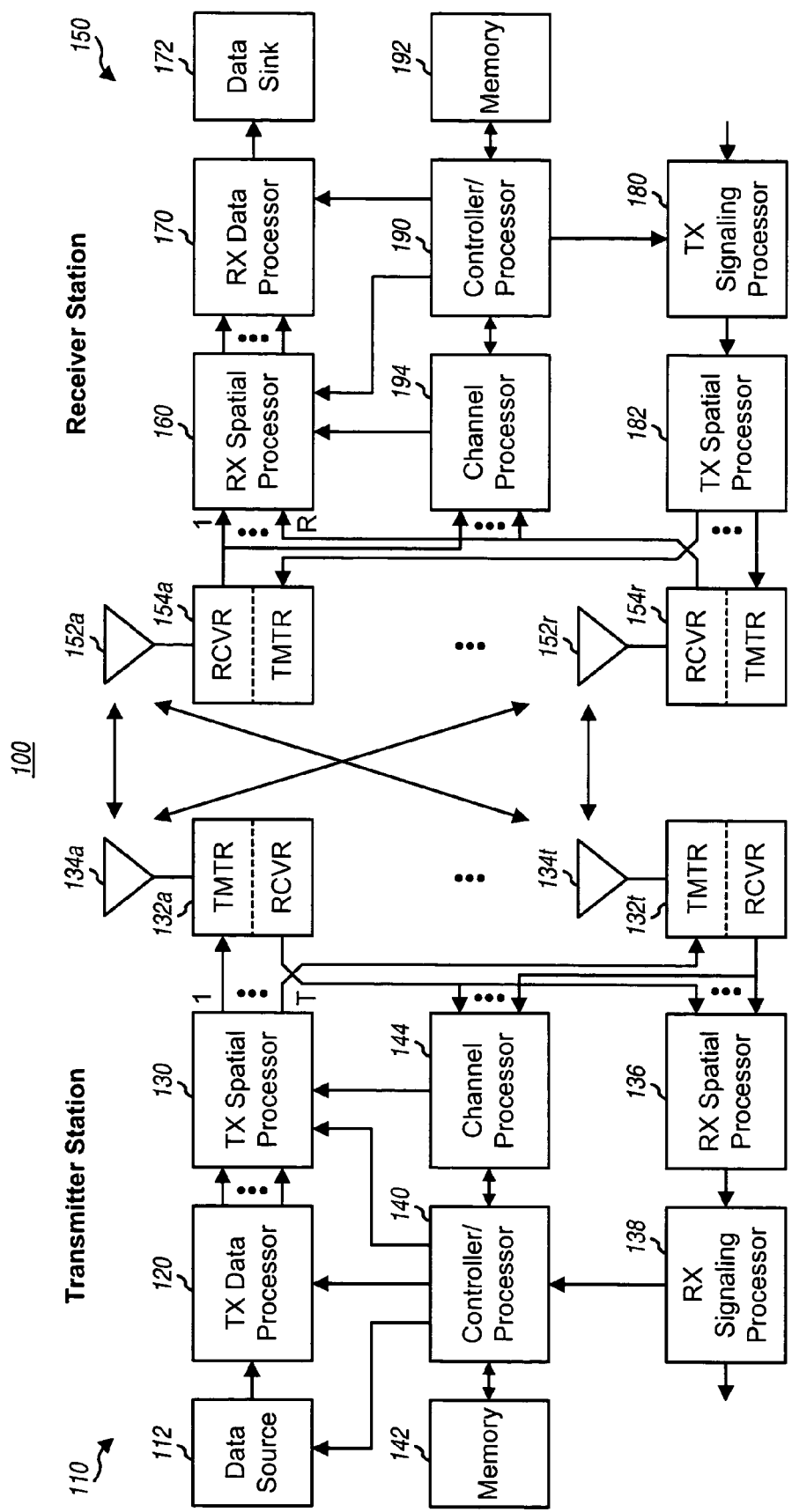
FIG. 1 shows a block diagram of a transmitter station and a receiver station.

FIG. 1 shows a block diagram of an embodiment of two stations 110 and 150 in a wireless communication network 100. For downlink (or forward link) transmission, station 110 may be part of, and may contain some or all of the functionality of, an access point, a base station, a Node B, and/or some other network entity. Station 150 may be part of, and may contain some or all of the functionality of, a terminal, a mobile station, a user equipment, a subscriber unit, and/or some other device. For uplink (or reverse link) transmission, station 110 may be part of a terminal, a mobile station, a user equipment, and so on, and station 150 may be part of an access point, a base station, a Node B, and so on. Station 110 is a transmitter of a data transmission and is equipped with multiple (T) antennas. Station 150 is a receiver of the data transmission and is equipped with multiple (R) antennas. Each transmit antenna and each receive antenna may be a physical antenna or an antenna array.

At transmitter station 110, a transmit (TX) data processor 120 receives traffic data from a data source 112, processes (e.g., formats, encodes, interleaves, and symbol maps) the traffic data in accordance with one or more rates, and generates data symbols. As used herein, a data symbol is a symbol for data, a pilot symbol is a symbol for pilot, and a symbol is typically a complex value. The data symbols and pilot symbols may be modulation symbols from a modulation scheme such as PSK or QAM. Pilot is data that is known a priori by both a transmitter and a receiver. A rate may indicate a data rate or information bit rate, a coding scheme or code rate, a modulation scheme, a packet size, and/or other parameters. A rate may also be referred to as a packet format, a transport format, or some other terminology. TX data processor 120 demultiplexes the data symbols into M streams, where $1 \leq M \leq T$. The data symbol streams may also be referred to as data streams, spatial streams, output streams, or some other terminology.

A TX spatial processor 130 multiplexes the data symbols with pilot symbols, performs transmit steering on the data symbols and/or pilot symbols as described below, and provides T output symbol streams to T transmitters (TMTR) 132a through 132t. Each transmitter 132 processes (e.g., OFDM modulates, converts to analog, filters, amplifies, and upconverts) its output symbol stream and generates a modulated signal. T modulated signals from transmitters 132a through 132t are transmitted from antennas 134a through 134t, respectively.

At receiver station 150, R antennas 152a through 152r receive the T modulated signals from transmitter station 110, and each antenna 152 provides a received signal to a respective receiver (RCVR) 154. Each receiver 154 processes (e.g., filters, amplifies, downconverts, digitizes, and OFDM demodulates) its received signal, provides received data symbols to a receive (RX) spatial processor 160, and provides received pilot symbols to a channel processor 194. Channel processor 194 estimates the MIMO channel response based on the received pilot symbols and provides channel estimates to RX spatial processor 160. RX spatial processor 160 performs MIMO detection on the received data symbols with the channel estimates and provides data symbol estimates. An RX data processor 170 further processes (e.g., deinterleaves and decodes) the data symbol estimates and provides decoded data to a data sink 172.

Receiver station 150 may send feedback information to base station 110. The feedback information may comprise one or more rates to use for transmission, transmit steering matrices, channel quality indicators (CQIs), and/or other information. The feedback information is processed by a TX signaling processor 180, multiplexed with pilot symbols and spatially processed by a TX spatial processor 182, and further processed by transmitters 154a through 154r to generate R modulated signals, which are transmitted via antennas 152a through 152r.

At transmitter station 110, the modulated signals from receiver station 150 are received by T antennas 134a through 134t, processed by receivers 132a through 132t, spatially processed by an RX spatial processor 136, and further processed by an RX signaling processor 138 to recover the feedback information sent by station 150. A controller/processor 140 controls the data transmission to receiver station 150 based on the feedback information. A channel processor 144 may estimate the channel response based on received pilot symbols and provides channel estimates, which may be used for transmit steering.

Controllers/processors 140 and 190 control the operation at stations 110 and 150, respectively. Memories 142 and 192 store data and program codes for stations 110 and 150, respectively.

The MIMO channel formed by the T antennas at transmitter station 110 and the R antennas at receiver station 150 may be characterized by an R×T channel response matrix H(k) for each subcarrier k, which may be expressed as:

$$H(k) = \begin{bmatrix} h_{1,1}(k) & h_{1,2}(k) & \cdots & h_{1,T}(k) \\ h_{2,1}(k) & h_{2,2}(k) & \cdots & h_{2,T}(k) \\ \vdots & \vdots & \ddots & \vdots \\ h_{R,1}(k) & h_{R,2}(k) & \cdots & h_{R,T}(k) \end{bmatrix}, k = 1, \ldots, K, \quad \text{Eq (1)}$$

where entry $h_{i,j}(k)$, for i=1, . . . , R and j=1, . . . , T, is the coupling or complex gain between transmit antenna j and receive antenna i for subcarrier k. Receiver station 150 may estimate H(k) based on a pilot sent by transmitter system 110. For simplicity, the description herein assumes no error in channel estimation.

In certain aspects, to provide directionalized transmission the channel response matrix H(k) for each subcarrier k may be diagonalized with either eigenvalue decomposition or singular value decomposition to obtain S eigenmodes of H(k), where $S \leq \min\{T, R\}$. The eigenmodes may be viewed as orthogonal spatial channels.

Singular value decomposition of H(k) may be expressed as:

$$H(k) = U(k) \cdot \Sigma(k) \cdot V^H(k), \quad \text{Eq (2)}$$

where U(k) is an R×R unitary matrix of left singular vectors of H(k), $\Sigma(k)$ is an R×T diagonal matrix of singular values of H(k), V(k) is a T×T unitary matrix of right singular vectors of H(k), and "$H$" denotes a conjugate transpose.

A unitary matrix V is characterized by the property $V^H \cdot V = I$, where I is the identity matrix. The columns of V are orthogonal to one another and each column has unit power. The diagonal elements of $\Sigma(k)$ are singular values that represent the channel gains of the eigenmodes of $H(k)$.

Eigenvalue decomposition of $H(k)$ may be expressed as:

$$R(k) = H^H(k) \cdot H(k) = V(k) \cdot \Lambda(k) \cdot V^H(k), \qquad \text{Eq (3)}$$

where $R(k)$ is a $T \times T$ channel covariance matrix, $\Lambda(k)$ is a $T \times T$ diagonal matrix of eigenvalues of $R(k)$, and
$V(k)$ is a $T \times T$ unitary matrix of eigenvectors of $R(k)$.

The diagonal elements of $\Lambda(k)$ are eigenvalues that represent the power gains of the eigenmodes of $R(k)$. The eigenvalues in $\Lambda(k)$ are the squares of the singular values in $\Sigma(k)$.

As shown in equations (2) and (3), the columns of $V(k)$ are right singular vectors of $H(k)$ as well as eigenvectors of $R(k)$. $V(k)$ may be referred to as a transmit steering matrix, a beamforming matrix, an eigen-steering matrix, a steering matrix, and so on. The singular value decomposition in equation (2) and eigenvalue decomposition in equation (3) may be performed using various techniques, such as with Jacobi rotation described in commonly assigned U.S. patent application Ser. No. 10/096,839, entitled "Efficient Computation for Eigenvalue Decomposition and Singular Value Decomposition of Matrices," filed Mar. 31, 2005.

Transmitter station 110 may perform transmit steering with $V(k)$ to send data symbols on the eigenmodes of $H(k)$, as follows:

$$x(k) = V(k) \cdot s(k), \qquad \text{Eq (4)}$$

where $s(k)$ is a $T \times 1$ vector with up to S data symbols to be sent on subcarrier k, and
$x(k)$ is a $T \times 1$ vector with T output symbols for T antennas on subcarrier k.

Transmit steering with right singular vectors in equation (4) is also referred to as beamsteering, eigensteering, beamforming, eigen-beamforming, and so on. The transmit steering in equation (4) maximizes system capacity.

While the above discussion, relates to utilizing eigenvalue decomposition or singular value decomposition to determine the steering or beamforming vectors or matrices, other approaches to determining the directionality matrices, vectors, or weights may be utilized, with any of the aspects discusses herein.

Receiver station 150 may perform singular value decomposition or eigenvalue decomposition independently for each data subcarrier and obtain a set of transmit steering matrices for all data subcarriers. A data subcarrier is a subcarrier usable for data transmission. Receiver station 150 may then send the set of transmit steering matrices to transmitter station 110, which may perform transmit steering for each data subcarrier with the transmit steering matrix for that subcarrier.

System 100 may utilize time division duplexing (TDD), which uses a single frequency channel for both the downlink and uplink. Since one frequency channel is used for both links, the MIMO channel response for one link may be assumed to be reciprocal of the MIMO channel response for the other link. That is, if $H(k)$ is the MIMO channel response for the link from transmitter station 110 to receiver station 150, then a reciprocal channel implies that the MIMO channel response for the link from receiver station 150 to transmitter station 110 may be given as $H^T(k)$, where "$T$" denotes a transpose. Channel reciprocity in the TDD system allows a channel response for one link to be estimated based on pilot sent on the other link. Thus, receiver station 150 may send a pilot to transmitter station 110, which may estimate the MIMO channel response based on the pilot from receiver station 150. Transmitter station 110 may then perform singular value decomposition or eigenvalue decomposition to obtain a set of transmit steering matrices for all data subcarriers.

In general, transmitter station 110 may obtain the transmit steering matrices based on explicit and/or implicit feedback from receiver station 150. Explicit feedback may comprise transmit steering matrices derived by receiver station 150 based on pilot sent by transmitter station 110. Implicit feedback may comprise pilot sent by receiver station 150 and used by transmitter station 110 to derive the transmit steering matrices. In any case, deriving a transmit steering matrix for each data subcarrier may require significant computational resources at the transmitter and/or receiver station. Furthermore, sending explicit and/or implicit feedback for each data subcarrier may require a significant amount of radio resources.

An OFDM-based system is typically designed such that a wideband, frequency selective communication channel appears like multiple, narrowband, flat-fading communication channels to a receiver. The spacing between adjacent subcarriers is typically selected to assure that each subcarrier experiences flat fading. The spacing is related to, and determined by, the expected maximum channel delay spread or minimum frequency coherence. In some aspects, some frequency coherence typically exists between subcarriers and adjacent subcarriers may be correlated with respect to their channel parameters. Thus, in certain aspects a transmit steering matrix derived for one subcarrier may be used for transmit steering of some nearby subcarriers. Significant reduction in computation and feedback overhead may be realized by reusing transmit steering matrices.

In an embodiment, receiver station 110 sends channel information for only a subset of all data subcarriers. The channel information may comprise transmit steering matrices $V(k)$, eigenvectors or right singular vectors, channel response matrices $H(k)$, channel covariance matrices $R(k)$, unsteered pilot, steered pilot, and/or other channel related information. The subcarriers for which channel information is sent are referred to as designated subcarriers.

Figure 2:
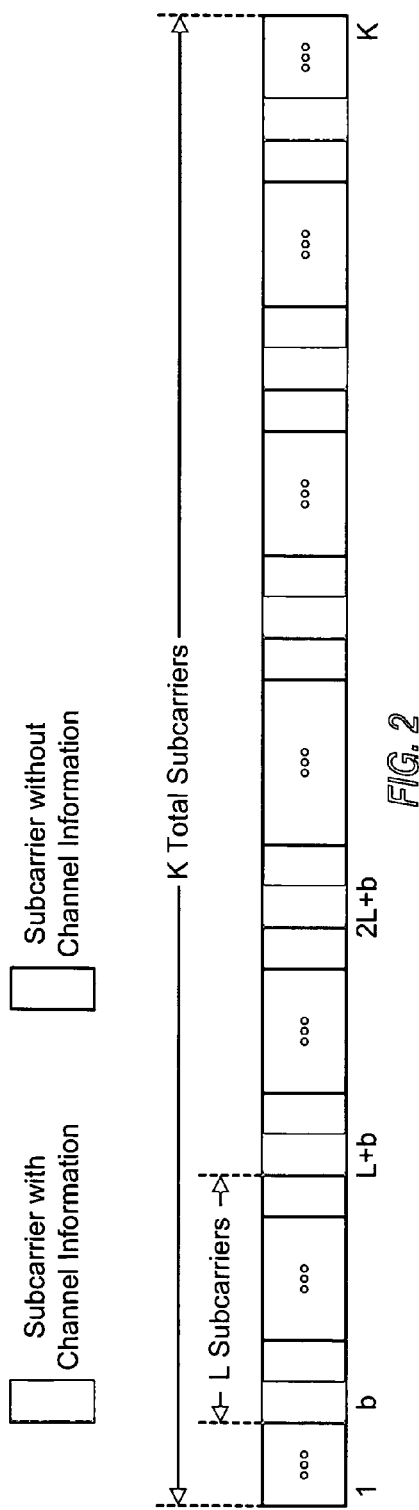
FIG. 2 shows feedback of channel information on fixed subcarriers.

FIG. 2 shows an embodiment of fixed designated subcarriers. In this embodiment, the K total subcarriers are assumed to be usable for transmission and are assigned indices of 1 through K. The designated subcarriers are uniformly distributed across the K subcarriers and include every L-th subcarrier, or subcarriers b, L+b, 2L+b, and so on, where L>1 and b is an index of the first designated subcarrier. The uniform distribution of the designated subcarriers allows for sampling of the entire system bandwidth in the frequency domain.

In an embodiment, L is a fixed value that is selected to provide good performance for most operating environments. In an embodiment, L is equal to three, which allows the channel information for a given designated subcarrier to be used for that designated subcarrier as well as data subcarriers to the left and right of the designated subcarrier. In another embodiment, L is a configurable value that may be any positive integer value. If L=1, then channel information is sent for each data subcarrier.

Figure 3:
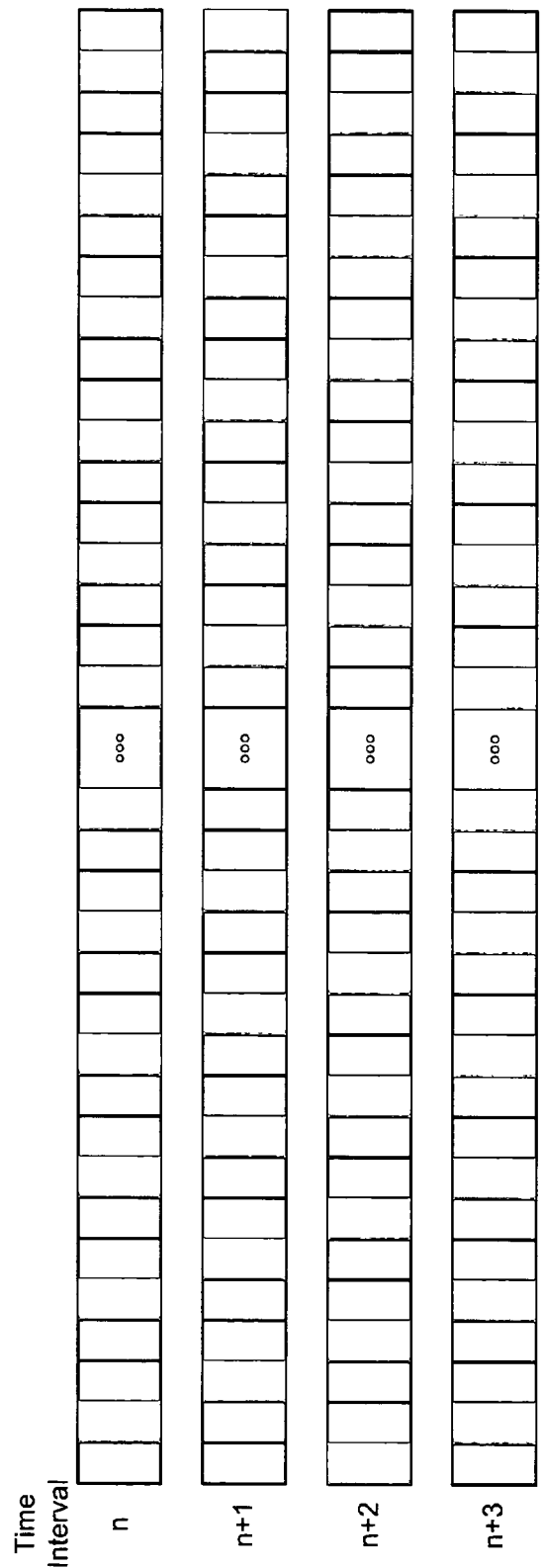
FIG. 3 shows feedback of channel information on varying subcarriers.

FIG. 3 shows an embodiment of varying designated subcarriers. In the example shown in FIG. 3, L=3, three sets of designated subcarriers are formed, and the subcarriers in each set are staggered with respect to the subcarriers in the other two sets. The three sets may be cycled through and selected in three time intervals, as shown in FIG. 3. In general, different designated subcarriers may be selected in different time intervals, e.g., based on a predetermined pattern or a pseudo-random sequence that is known to both the transmitter and receiver. Varying the designated subcarriers allows for feedback of channel information for different subcarriers in different time intervals, which may provide diversity against frequency selective fading.

Figure 4:
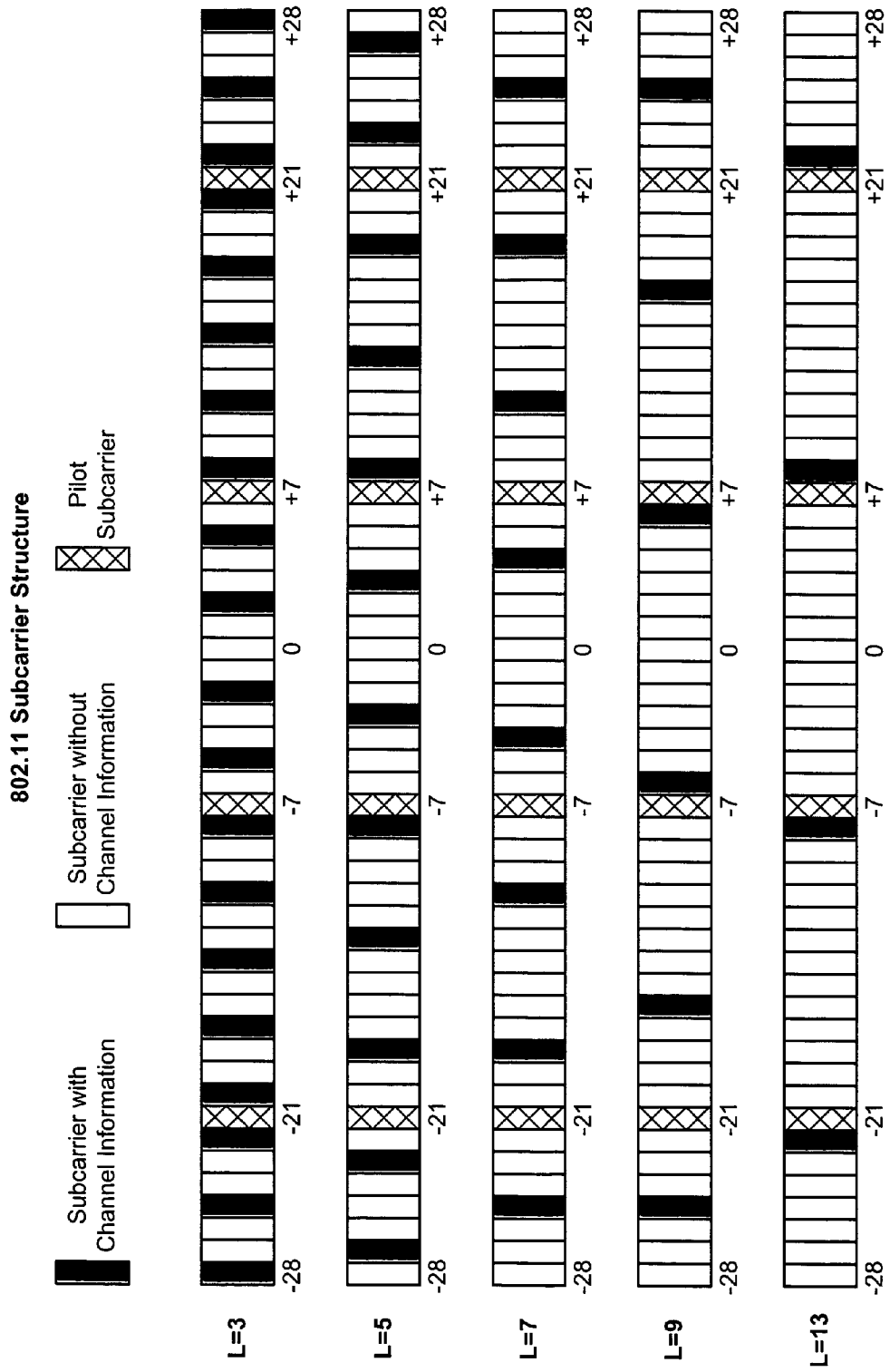
FIG. 4 shows feedback of channel information in IEEE 802.11.

FIG. 4 shows an embodiment of designated subcarriers for IEEE 802.11. IEEE 802.11 uses a subcarrier structure with K=64 total subcarriers that are assigned indices of −31 to +32. In IEEE 802.11a/g, 52 subcarriers with indices of −26 to −1 and +1 to +26 are usable for transmission, four subcarriers with indices of −21, −7, +7 and +21 are used for carrier pilot, and the subcarrier with index of 0 is not used for transmission. In IEEE 802.11n, 56 subcarriers with indices of −28 to −1 and +1 to +28 are usable for transmission. FIG. 4 and Table 1 show exemplary designated subcarriers for different values of L. Other designated subcarriers may also be selected.

TABLE 1

| L | Designated Subcarriers |
|---|---|
| 3 | ±2, 5, 8, 11, 14, 17, 20, 22, 25 and 28 |
| 5 | ±3, 8, 13, 18, 23 and 27 |
| 7 | ±4, 11, 18 and 25 |
| 9 | ±6, 16 and 25 |
| 13 | ±8 and 22 |

In an embodiment, the designated subcarriers are known a priori by both the transmitter and receiver stations. This embodiment avoids the need to send signaling to identify the designated subcarriers. In another embodiment, multiple sets of designated subcarriers are defined, and one set of designated subcarriers is selected for use and identified by signaling.

In an embodiment, L is configurable and determined based on channel conditions. The designated subcarriers may be selected during call setup, whenever changes in channel conditions are detected, and/or at other times. In an embodiment, receiver station 150 determines frequency selectivity of the wireless channel and selects L based on the amount of frequency selectivity. A smaller L value may be used for a wireless channel with more frequency selectivity, and a larger L value may be used for a wireless channel with less frequency selectivity.

Frequency selectivity may be quantified by delay spread, which is the difference between the arrival time of the earliest signal path and the arrival time of the latest signal path at receiver station 150. Delay spread may be determined by estimating a channel impulse response, determining the earliest delay $\tau_{min}$ and the latest delay $\tau_{max}$ for which the channel impulse response amplitude exceeds a predetermined threshold, and deriving the delay spread as $\tau_{max} - \tau_{min}$. Delay spread may also be determined by deriving a power delay profile, which is the power of the channel impulse response as a function of relative delay, and setting delay spread equal to the width of the power delay profile. Delay spread and delay power delay profile are described by P. A. Bello in a paper entitled "Characterization of Randomly Time-Variant Linear Channels," IEEE Trans. Communications, vol CS-11, pp 360-393, December 1963.

Frequency selectivity may also be quantified by coherence bandwidth, which is related to the rate of change of the channel response matrices as a function of frequency. A frequency correlation function Q(l) may be defined as:

$$Q(l) = \frac{1}{(K-l) \cdot T \cdot R} \cdot \sum_{k=1}^{K-l} \sum_{j=1}^{T} \sum_{i=1}^{R} h_{i,j}^*(k) \cdot h_{i,j}(k+l),$$ Eq (5)

where l represents frequency delta and "*" denotes a complex conjugate.

Coherence bandwidth may be estimated based on the width of Q(l) as follows:

$$BW_C = \frac{L_C + 1}{T_{sam}},$$ Eq (6)

where $L_c$ is the smallest value of l for which $|Q(l)| \leq \beta \cdot |Q(0)|$,
β is a threshold value between 0 and 1,
$T_{sam}$ is sample duration, and
$BW_c$ is the coherence bandwidth.

Delay spread and coherence bandwidth may also be determined in other manners. In general, coherence bandwidth is inversely related to delay spread. Hence, a smaller coherence bandwidth corresponds to a larger delay spread, and vice versa. L may be related to coherence bandwidth and inversely related to delay spread. A function or a look-up table may be defined for L versus delay spread or coherence bandwidth. A suitable L value may then be selected based on the estimated delay spread or coherence bandwidth of the wireless channel.

Receiver station 150 may send various types of channel information to transmitter station 110. In an embodiment of explicit feedback, receiver station 150 sends an entire transmit steering matrix V(k) for each designated subcarrier. In another embodiment of explicit feedback, receiver station 150 sends a partial transmit steering matrix for each designated subcarrier. In these embodiments, receiver station 150 may perform eigenvalue decomposition or singular value decomposition for each designated subcarrier, instead of each data subcarrier, which may reduce computation. Furthermore, receiver station 150 may perform decomposition for each designated subcarrier in an iterative manner, e.g., using Jacobi rotation. Receiver station 150 may use a final solution of the transmit steering matrix for one designated subcarrier as an initial solution of the transmit steering matrix for another designated subcarrier, which may reduce the number of iterations to derive the final solution.

In yet another embodiment of explicit feedback, receiver station 150 orders the singular values (or eigenvalues) for each subcarrier from largest to smallest and also orders the right singular vectors for that subcarrier in the same manner so that each right singular vector is associated with the same singular value before and after the ordering. The ordered right singular vectors may be denoted as $v_1(k), v_2(k), \ldots, v_T(k)$. The ordered singular values may be denoted as $\sigma_1(k) \geq \sigma_2(k) \geq \ldots \geq \sigma_T(k)$. A wideband eigenmode is the set of same-order eigenmodes for all subcarriers after the ordering, e.g., wideband eigenmode m includes eigenmode m of all subcarriers. Receiver station 150 may perform rank prediction and evaluate data performance (e.g., overall throughput) for different numbers of wideband eigenmodes, e.g., the best wideband eigenmode, the two best wideband eigenmodes, and so on, and min {T, R} wideband eigenmodes. The number of wideband eigenmodes with the best performance is denoted as M and referred to as the predicted rank of the MIMO channel, where $1 \leq M \leq \min \{T, R\}$. Receiver station 150 may then send the first M eigenvectors, corresponding to the M best wideband eigenmodes, for each designated subcarrier.

In another embodiment of explicit feedback, receiver station 150 sends a normalized right singular vector $\tilde{v}_1(k)$ for each designated subcarrier for the principal wideband eigenmode, which is the wideband eigenmode with the largest singular values. The elements of $\tilde{v}_1(k)$ have unit magnitude but the same phase as the elements of $v_1(k)$. $\tilde{v}_1(k)$ allows the full transmit power available for each antenna to be used for data transmission. In yet another embodiment of explicit feedback, receiver station 150 sends a channel response matrix H(k) for each designated subcarrier. In yet another embodiment, receiver station 150 sends a channel covariance matrix R(k) for each designated subcarrier.

In an embodiment that is applicable for explicit feedback, receiver station 150 sends full/complete values for each matrix reported to transmitter station 110. (A vector may be considered as a degenerated matrix containing one column.) In another embodiment, receiver station 150 sends full values for some reported matrices and differential/delta values for remaining reported matrices. For example, receiver station 150 may compute differential values for a channel response matrix $H(k_i)$ as $\Delta H(k_i) = H(k_i) - H(k_0)$ and may send back $H(k_0)$ and $\Delta H(k_i)$, where $k_i$ for i=0, 1, . . . , are designated subcarriers. In yet another embodiment, receiver station 150 maps a computed matrix to the nearest matrix in a codebook and sends the nearest matrix. For example, a codebook of possible matrices may be defined for V(k), and one matrix may be selected from the codebook for each designated subcarrier based on the matrix computed for that subcarrier. In yet another embodiment, receiver station 150 performs coding or compression of the matrices to be reported in order to reduce the amount of information to send.

In an embodiment of implicit feedback, receiver station 150 sends an unsteered pilot on each designated subcarrier. An unsteered pilot is a pilot sent without transmit steering. Receiver station 150 may send an unsteered pilot via R antennas by (1) applying different orthogonal codes to the pilot transmissions sent from the R antennas or (2) sending the pilot transmissions from the R antennas in different time intervals. Transmitter station 110 may derive a channel response matrix for each designated subcarrier based on the unsteered pilot received on the subcarrier. Transmitter station 110 may decompose the channel response matrix for each designated subcarrier to obtain a transmit steering matrix for that subcarrier.

In another embodiment of implicit feedback, receiver station 150 sends a steered pilot on each designated subcarrier. A steered pilot is a pilot sent with transmit steering. Receiver station 150 may perform singular value decomposition of H(k) as shown in equation (2) and obtain U(k). Alternatively, receiver station 150 may perform eigenvalue decomposition of $H(k) \cdot H^H(k)$, instead of $H^H(k) \cdot H(k)$ as shown in equation (3), to obtain U(k). Receiver station 150 may send a steered pilot on each eigenmode m, as follows:

$$x_m(k) = u_m^*(k) \cdot p(k), \quad \text{Eq (7)}$$

where p(k) is a pilot symbol sent on subcarrier k, $u_m(k)$ is an R×1 left singular vector for eigenmodes m of subcarrier k, and $x_m(k)$ is an R×1 vector of output symbols for R antennas on subcarrier k.

In an embodiment, receiver station 150 may cycle through the S eigenmodes in different symbol periods. In another embodiment, receiver station 150 may send steered pilots on the S eigenmodes on different subcarriers, e.g., use subcarriers a, a+S, . . . for eigenmode 1, use subcarriers a+1, a+S+1, . . . for eigenmode 2, and so on, and use subcarriers a+S−1, a+2S−1, . . . for eigenmode S.

The received steered pilot at transmitter station 110 may be expressed as:

$$\underline{r}_m(k) = \underline{H}^T(k) \cdot \underline{x}_m(k) + \underline{n}_{tx}(k) \quad \text{Eq (8)}$$
$$= \underline{H}^T(k) \cdot \underline{u}_m^*(k) \cdot p(k) + \underline{n}_{tx}(k)$$
$$= \underline{V}^*(k) \cdot \sum(k) \cdot \underline{U}^T(k) \cdot \underline{u}_m^*(k) \cdot p(k) + \underline{n}_{tx}(k)$$
$$= \underline{v}_m^*(k) \cdot \sigma_m(k) \cdot p(k) + \underline{n}_{tx}(k)$$

where $H^T(k) = V^*(k) \cdot (k) \cdot U^T(k)$ is the singular value decomposition of the wireless channel from receiver station 150 to transmitter station 110, $\sigma_m(k)$ is the singular value for eigenmode m of subcarrier k, and $n_{tx}(k)$ is a vector of noise for subcarrier k at transmitter station 110.

Equation (8) assumes channel reciprocity in a TDD system, so that $H^T(k)$ is the response of the MIMO channel from receiver station 150 to transmitter station 110. Equation (8) indicates that transmitter station 110 may estimate both V(k) and Σ(k) for each designated subcarrier based on a steered pilot sent by receiver station 150 without having to estimate the MIMO channel response or perform decomposition.

Transmitter station 110 obtains a transmit steering matrix for each designated subcarrier based on the channel information received from receiver station 150. Transmitter station 110 transmits data on the data subcarriers with the transmit steering matrices obtained for the designated subcarriers.

In an embodiment, transmitter station 110 performs transmit steering for each data subcarrier with the transmit steering matrix for the closest designated subcarrier. As an example, for L=3 in Table 1, the transmit steering matrix for designated subcarrier 2 may be used for each of data subcarriers 1, 2 and 3, the transmit steering matrix for designated subcarrier 5 may be used for each of data subcarriers 4, 5 and 6, and so on. For L=5 in Table 1, the transmit steering matrix for designated subcarrier 3 may be used for each of data subcarriers 1 through 5, the transmit steering matrix for designated subcarrier 8 may be used for each of data subcarriers 6, 8, 9 and 10, and so on.

In another embodiment, transmitter station 110 interpolates the transmit steering matrices for the designated subcarriers to obtain a transmit steering matrix for each data subcarrier. For example, transmitter station 110 may perform linear interpolation on two transmit steering matrices for two designated subcarriers to obtain L−1 interpolated transmit steering matrices for L−1 subcarriers between these two designated subcarriers. Transmitter station 110 may perform interpolation in other manners and/or on more than two transmit steering matrices for more than two designated subcarriers.

Transmitter station 110 may perform transmit steering for each data subcarrier as follows:

$$x(k) = \hat{V}(k) \cdot s(k), \quad \text{Eq (9)}$$

where $\hat{V}(k)$ is a transmit steering matrix for data subcarrier k. $\hat{V}(k)$ may be a transmit steering matrix for a designated subcarrier closest to data subcarrier k or an interpolated transmit steering matrix computed for data subcarrier k.

The received symbols at receiver station 150 may be expressed as:

$$\underline{r}(k) = \underline{H}(k) \cdot \underline{x}(k) + \underline{n}_{tx}(k) \quad \text{Eq (10)}$$
$$= \underline{H}(k) \cdot \underline{\hat{V}}(k) \cdot s(k) + \underline{n}_{tx}(k)$$
$$= \underline{H}_{eff}(k) \cdot \underline{x}(k) + \underline{n}_{tx}(k)$$

where $H_{eff}(k) = H(k) \cdot \hat{V}(k)$ is an effective channel response matrix for subcarrier k, and $n_{rx}(k)$ is a vector of noise for subcarrier k at receiver station 150.

For simplicity, the noise may be assumed to be additive white Gaussian noise (AWGN) with a zero mean vector and a covariance matrix of $n_{rx}(k) = \sigma_n^2 \cdot I$, where $\sigma_n^2$ is the variance of the noise.

Receiver station 150 may obtain $H_{eff}(k)$ in various manners. In one embodiment, transmitter station 110 sends an unsteered pilot on all or a subset of the data subcarriers. Receiver station 150 obtains a channel response matrix H(k) for each subcarrier in which the unsteered pilot is sent and decomposes the channel response matrix for each designated subcarrier to obtain a transmit steering matrix V(k) for that subcarrier. Receiver station 150 then sends the transmit steering matrices (or a steered pilot) for the designated subcarriers to transmitter station 110. Receiver station 150 also uses these transmit steering matrices to derive the effective channel response matrices for the data subcarriers.

In another embodiment, receiver station 150 sends an unsteered pilot on the designated subcarriers. Transmitter station 110 obtains a channel response matrix $H^T(k)$ for each designated subcarrier and decomposes $H^T(k)$ to obtain a transmit steering matrix V(k). Transmitter station 110 may send an unsteered or steered pilot on the designated subcarriers, on all data subcarriers, or a subset of data subcarriers to allow receiver station 150 to obtain the effective channel response matrices. In general, either station or both stations may send pilot, either station or both stations may perform decomposition, and receiver station 150 may obtain the effective channel response matrices in various manners.

Receiver station 150 may use various MIMO detection techniques to recover the data symbols sent by transmitter station 110. These MIMO detection techniques include minimum mean square error (MMSE), zero-forcing (ZF), maximal ratio combining (MRC), maximum likelihood (ML) decoding, list sphere decoding (LSD), decision feedback equalization (DFE), and successive interference cancellation (SIC) techniques. Receiver station 150 may derive a spatial filter matrix for each data subcarrier k based on the MMSE technique, as follows:

$$M(k) = D(k) \cdot [H_{eff}^H(k) \cdot H_{eff}(k) + \sigma_n^2 \cdot I]^{-1} \cdot H_{eff}^H(k), \quad \text{Eq (11)}$$

where $D(k) = [\text{diag} \{[H_{eff}^H(k) \cdot H_{eff}(k) + \rho_n^2 \cdot I]^{-1} \cdot H_{eff}^H(k) \cdot H_{eff}\}]^{-1}$ is a diagonal matrix of scaling values used to obtain normalized estimates of the data symbols.

Receiver station 150 may perform MIMO detection as follows:

$$\hat{s}(k) = M(k) \cdot r(k) = s(k) + \tilde{n}_{rx}(k), \quad \text{Eq (12)}$$

where $\hat{s}(k)$ is a T×1 vector of data symbol estimates for data subcarrier k, and $\tilde{n}_{rx}(k)$ is a vector of noise after the MIMO detection.

The data symbol estimates in $\hat{s}(k)$ are estimates of the data symbols in s(k).

Figure 5:
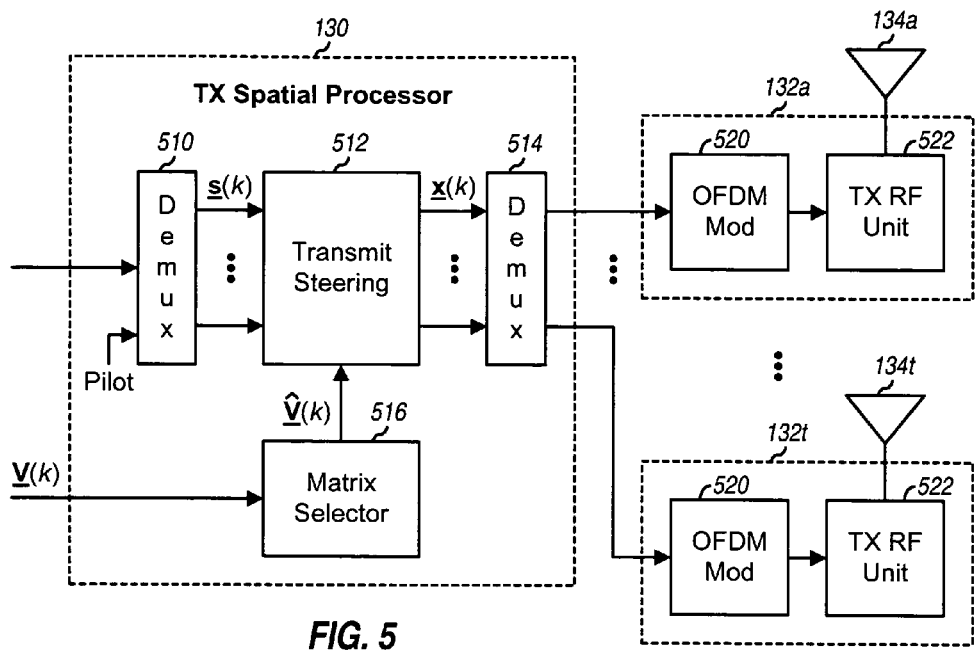
FIG. 5 shows a block diagram of a transmit (TX) spatial processor.

FIG. 5 shows a block diagram of an embodiment of TX spatial processor 130 and transmitters 132a through 132t at transmitter station 110. Within TX spatial processor 130, a demultiplexer (Demux) 510 receives the data symbols from TX data processor 120, maps the data symbols and pilot symbols to the proper subcarriers, and provides vector s(k) for each data subcarrier in each symbol period. A unit 516 receives transmit steering matrices V(k) for the designated subcarriers (e.g., from receiver station 150 or channel processor 144) and determines a transmit steering matrix $\hat{V}(k)$ for each data subcarrier (e.g., by using the transmit steering matrix for the closest designated subcarrier or by interpolating the transmit steering matrices for the closest designated subcarriers on both sides of the data subcarrier). A unit 512 performs transmit steering on vector s(k) for each data subcarrier with the transmit steering matrix $\hat{V}(k)$ for that subcarrier and provides output symbol vector x(k), as shown in equation (9). A demultiplexer 514 demultiplexes the output symbols and provides T output symbol streams to T transmitters 132a through 132t.

Each transmitter 132 includes an OFDM modulator (Mod) 520 and a TX radio frequency (RF) unit 522. OFDM modulator 520 receives an output symbol stream from demultiplexer 514 and generates OFDM symbols. TX RF unit 522 processes the OFDM symbols and generates a modulated signal for transmission via antenna 134.

Figure 6:
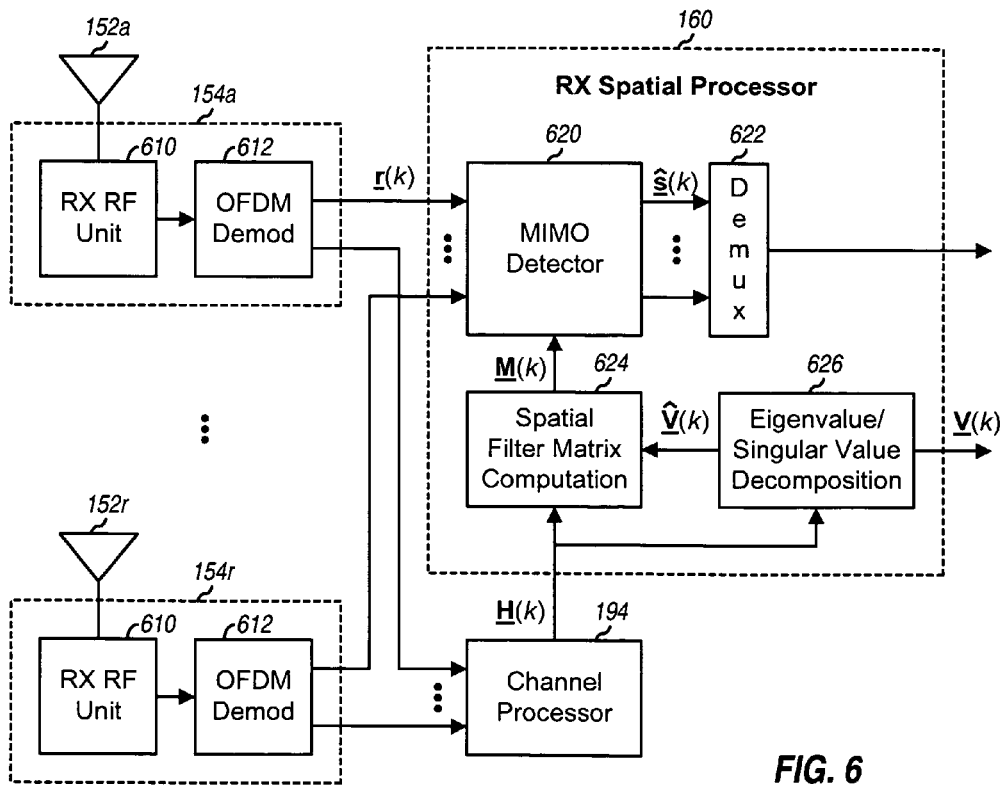
FIG. 6 shows a block diagram of a receive (RX) spatial processor.

FIG. 6 shows a block diagram of an embodiment of receivers 154a through 154r and RX spatial processor 160 at receiver station 150. Each antenna 152 receives the modulated signals from transmitter station 110 and provides a received signal to a respective receiver 154. Each receiver 154 includes an RX RF unit 610 and an OFDM demodulator (Demod) 612. RX RF unit 610 processes the received signal and provides samples. OFDM demodulator 612 performs OFDM demodulation on the samples, provides received data symbols to a MIMO detector 620 within RX spatial processor 160, and provides received pilot symbols to channel processor 194. Channel processor 194 estimates the MIMO channel response for each subcarrier with pilot transmission based on the received pilot symbols for that subcarrier. Channel processor 194 provides channel response matrices to a spatial filter matrix computation unit 624 and a decomposition unit 626 within RX spatial processor 160.

Unit 626 performs eigenvalue decomposition or singular value decomposition of the channel response matrix H(k) for each designated subcarrier and provides a transmit steering matrix V(k) for that subcarrier. The transmit steering matrices for the designated subcarriers may be sent back to transmitter station 110 or used to generate a steered pilot for transmitter station 110. Unit 626 also provides the transmit steering matrix $\hat{V}(k)$ for each data subcarrier to unit 624.

Unit 624 derives a spatial filter matrix M(k) for each data subcarrier based on the channel response matrix H(k) and the transmit steering matrix $\hat{V}(k)$ for that subcarrier, e.g., as shown in equation (11). Unit 624 may derive a spatial filter matrix for each data subcarrier whereas unit 626 may derive a transmit steering matrix for each designated subcarrier. Hence, a given transmit steering matrix V(k) may be used to derive spatial filter matrices for multiple data subcarriers. MIMO detector 620 performs MIMO detection on the received data symbols for each data subcarrier with the spatial filter matrix for that subcarrier, e.g., as shown in equation (12), and provides data symbol estimates. A demultiplexer 622 demultiplexes the data symbol estimates for all data subcarriers and provides the data symbol estimates to RX data processor 170.

The transmission techniques described herein may provide good data performance with substantial reduction in computation and feedback overhead. Computer simulations were performed for various MIMO dimensionalities (R×T), channel models, number of data streams, and receiver signal-to-noise ratios (SNRs). For the case with L=3 in Table 1, transmit steering matrices were derived for 20 out of 52 data subcarriers, and the transmit steering matrix for designated subcarrier j was used for data subcarriers j−1, j and j+1. Computation for transmit steering matrices was reduced by approximately 60% at a loss of about 3% of the capacity for channel model E compared to the case in which a transmit steering matrix was computed for each data subcarrier. Channel model E has the least frequency coherence, and performance is generally better for other channel models. Larger values of L provide greater reduction in computation albeit with more loss of capacity.

Figure 7:
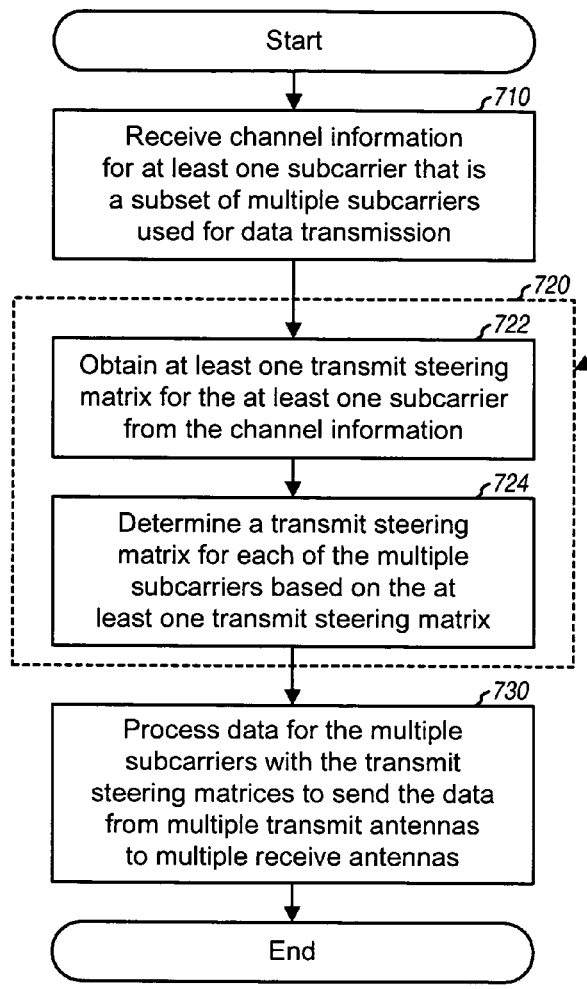
FIG. 7 shows a process for transmitting data.

FIG. 7 shows an embodiment of a process 700 for transmitting data. A transmitter station receives channel information for at least one subcarrier that is a subset of multiple subcarriers used for data transmission (block 710). The channel information may comprise at least one transmit steering matrix, at least one set of eigenvectors, at least one channel response matrix, or at least one channel covariance matrix for the at least one subcarrier. The channel information may also comprise an unsteered pilot or a steered pilot sent on the at least one subcarrier. The at least one subcarrier may be distributed across the multiple subcarriers and may be fixed or varied across multiple time intervals. The transmitter station obtains transmit steering matrices for the multiple subcarriers based on the channel information for the at least one subcarrier (block 720). The transmitter station processes data for the multiple subcarriers with the transmit steering matrices to send the data from multiple transmit antennas to multiple receive antennas (block 730).

In an embodiment of block 720, the transmitter station obtains at least one transmit steering matrix for the at least one subcarrier from the channel information (block 722). If the channel information is an unsteered pilot, then at least one channel response matrix may be obtained for the at least one subcarrier based on the unsteered pilot and decomposed to obtain the at least one transmit steering matrix. If the channel information is a steered pilot, then the at least one transmit steering matrix may be obtained directly based on the steered pilot. The transmitter station determines a transmit steering matrix for each of the multiple subcarriers based on the at least one transmit steering matrix (block 724). The transmit steering matrix for each of the multiple subcarriers may be (1) set equal to the transmit steering matrix obtained for the closest one of the at least one subcarrier or (2) derived by interpolating two or more transmit steering matrices obtained for two or more closest subcarriers. In an embodiment of block 730, the transmitter station performs transmit steering for each of the multiple subcarriers with the transmit steering matrix determined for that subcarrier.

Figure 8:
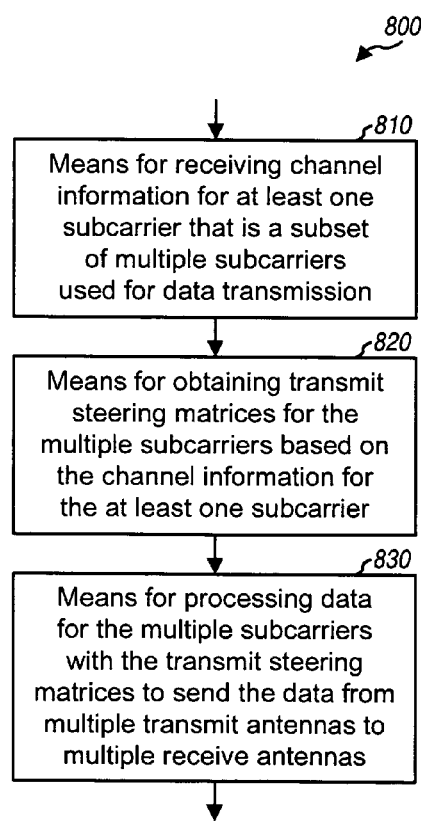
FIG. 8 shows an apparatus for transmitting data.

FIG. 8 shows an embodiment of an apparatus 800 for transmitting data. Apparatus 800 includes means for receiving channel information for at least one subcarrier that is a subset of multiple subcarriers used for data transmission (block 810), means for obtaining transmit steering matrices for the multiple subcarriers based on the channel information for the at least one subcarrier (block 820); and means for processing data for the multiple subcarriers with the transmit steering matrices to send the data from multiple transmit antennas to multiple receive antennas (block 830).

Figure 9:
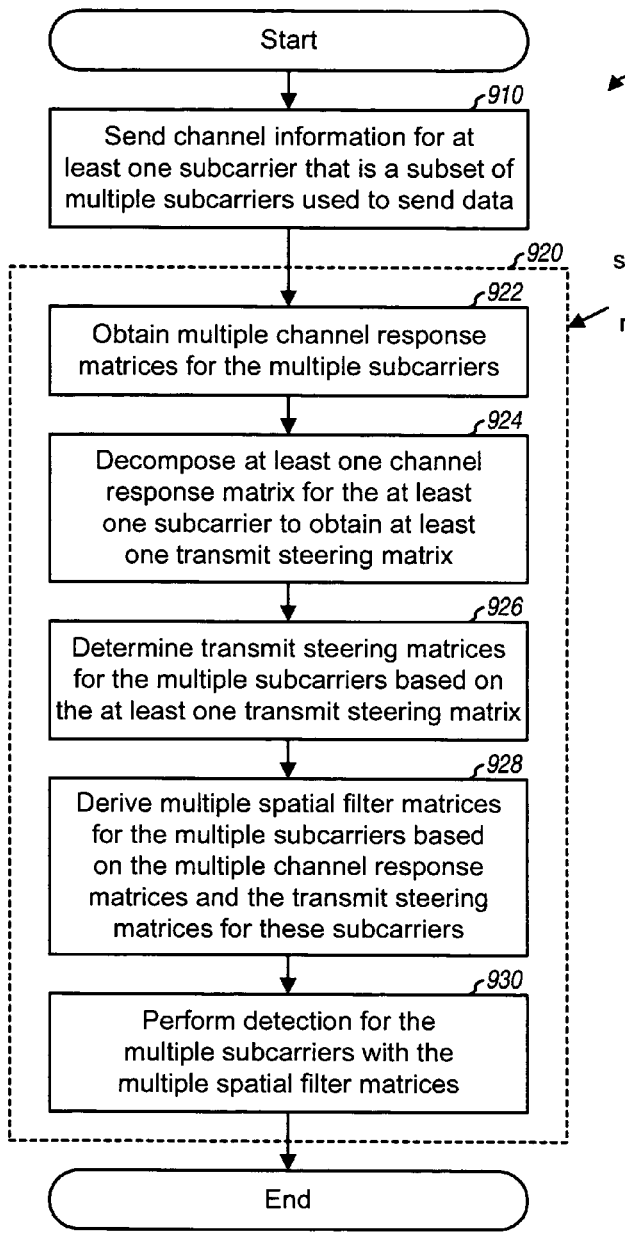
FIG. 9 shows a process for receiving data.

FIG. 9 shows an embodiment of a process 900 for receiving data. A receiver station sends channel information for at least one subcarrier that is a subset of multiple subcarriers used to send data (block 910). The receiver station receives a data transmission sent on the multiple subcarriers from multiple transmit antennas to multiple receive antennas using transmit steering matrices derived for the multiple subcarriers based on the channel information for the at least one subcarrier (block 920).

In an embodiment of block 910, the receiver station obtains at least one channel response matrix for the at least one subcarrier and decomposes the at least one channel response matrix to obtain at least one transmit steering matrix, e.g., V(k) and/or U(k). The receiver may send at least one transmit steering matrix V(k) as the channel information. The receiver station may also map the at least one transmit steering matrix V(k) to at least one codeword in a codebook and send the at least one codeword as the channel information. The receiver station may also send at least one channel response matrix or at least one channel covariance matrix as the channel information. The receiver station may also send a steered pilot on the at least one subcarrier using at least one transmit steering matrix U(k). The receiver station may determine frequency selectivity or delay spread of the wireless channel and determine the number of subcarriers to send channel information based on the frequency selectivity or delay spread of the wireless channel.

In an embodiment of block 920, the receiver station obtains multiple channel response matrices for the multiple subcarriers (block 922) and decomposes at least one channel response matrix for the at least one subcarrier to obtain at least one transmit steering matrix V(k) (block 924). The receiver station determines transmit steering matrices for the multiple subcarriers based on the at least one transmit steering matrix in the same manner as the transmitter station (block 926). The receiver station derives multiple spatial filter matrices for the multiple subcarriers based on the multiple channel response matrices and the transmit steering matrices for these subcarriers, e.g., in accordance with MMSE detection techniques (block 928). The receiver station then performs detection for the multiple subcarriers with the multiple spatial filter matrices (block 930).

Figure 10:
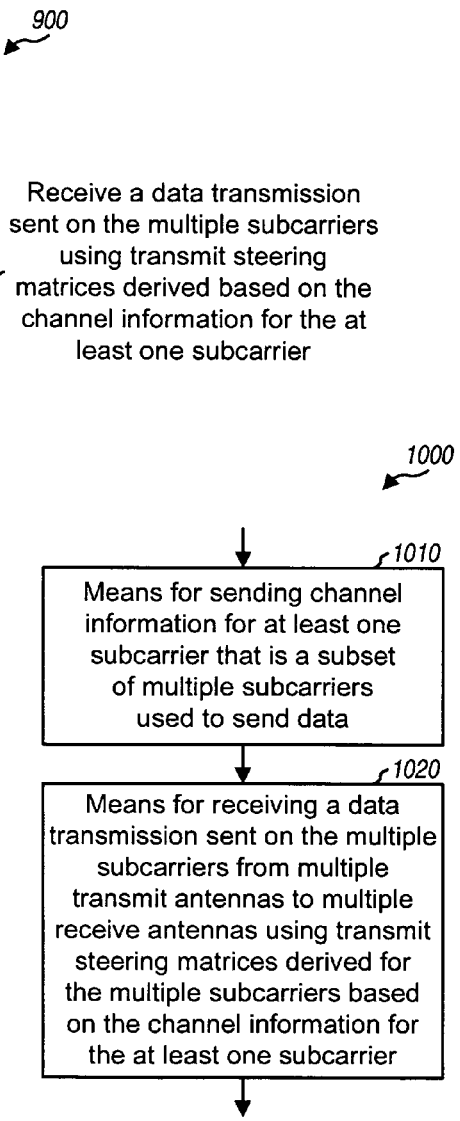
FIG. 10 shows an apparatus for receiving data.

FIG. 10 shows an embodiment of an apparatus 1000 for receiving data. Apparatus 1000 includes means for sending channel information for at least one subcarrier that is a subset of multiple subcarriers used to send data (block 1010) and means for receiving a data transmission sent on the multiple subcarriers from multiple transmit antennas to multiple receive antennas using transmit steering matrices derived for the multiple subcarriers based on the channel information for the at least one subcarrier (block 1020).

The transmission techniques described herein may be implemented by various means. For example, these techniques may be implemented in hardware, firmware, software, or a combination thereof. For a hardware implementation, the processing units at a transmitter station or a receiver station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 142 or 192 in FIG. 1) and executed by a processor (e.g., processor 140 or 190). The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

The invention claimed is:

1. An apparatus comprising:
at least one processor configured
to receive channel information for at least one subcarrier that is a subset of multiple subcarriers used for data transmission,
to obtain transmit steering matrices for the multiple subcarriers based on the channel information for the at least one subcarrier by obtaining at least one transmit steering matrix for the at least one subcarrier based on the channel information and determining a transmit steering matrix for each of the other multiple subcarriers based on the at least one transmit steering matrix by setting the transmit steering matrix for each of the other multiple subcarriers equal to a transmit steering matrix obtained for a closest one of the at least one subcarrier, and
to process data for the multiple subcarriers with the transmit steering matrices to send the data from multiple transmit antennas to multiple receive antennas; and
a memory coupled to the at least one processor.

2. The apparatus of claim 1, wherein the at least one processor is configured to perform transmit steering for each of the multiple subcarriers with the transmit steering matrix determined for the subcarrier.

3. The apparatus of claim 1, wherein the channel information comprises at least one transmit steering matrix for the at least one subcarrier.

4. The apparatus of claim 1, wherein the channel information comprises at least one eigenvector for each of the at least one subcarrier.

5. The apparatus of claim 1, wherein the channel information comprises at least one channel response matrix or at least one channel covariance matrix for the at least one subcarrier.

6. The apparatus of claim 2, wherein the channel information comprises a pilot sent on the at least one subcarrier, and wherein the at least one processor is configured to obtain the at least one transmit steering matrix based on the pilot sent on the at least one subcarrier.

7. The apparatus of claim 2, wherein the channel information comprises a pilot sent on the at least one subcarrier, and wherein the at least one processor is configured
to obtain at least one channel response matrix for the at least one subcarrier based on the pilot sent on the at least one subcarrier, and
to decompose the at least one channel response matrix to obtain the at least one transmit steering matrix.

8. The apparatus of claim 1, wherein the at least one subcarrier is distributed across the multiple subcarriers.

9. The apparatus of claim 1, wherein the at least one subcarrier varies across multiple time intervals.

10. A method comprising:
receiving channel information for at least one subcarrier that is a subset of multiple subcarriers used for data transmission;
obtaining transmit steering matrices for the multiple subcarriers based on the channel information for the at least one subcarrier by obtaining at least one transmit steering matrix for the at least one subcarrier from the channel information and determining a transmit steering matrix for each of the other multiple subcarriers based on the at least one transmit steering matrix by setting the transmit steering matrix for each of the other multiple subcarriers equal to a transmit steering matrix obtained for a closest one of the at least one subcarrier; and
processing data for the multiple subcarriers with the transmit steering matrices to send the data from multiple transmit antennas to multiple receive antennas.

11. The method of claim 10, wherein the processing data for the multiple subcarriers comprises:
performing transmit steering for each of the multiple subcarriers with the transmit steering matrix determined for the subcarrier.

12. An apparatus comprising:
means for receiving channel information for at least one subcarrier that is a subset of multiple subcarriers used for data transmission;
means for obtaining transmit steering matrices for the multiple subcarriers based on the channel information for the at least one subcarrier by obtaining at least one transmit steering matrix for the at least one subcarrier from the channel information and determining a transmit steering matrix for each of the other multiple subcarriers based on the at least one transmit steering matrix by setting the transmit steering matrix for each of the other multiple subcarriers equal to a transmit steering matrix obtained for a closest one of the at least one subcarrier; and
means for processing data for the multiple subcarriers with the transmit steering matrices to send the data from multiple transmit antennas to multiple receive antennas.

13. The apparatus of claim 12, wherein the means for processing data for the multiple subcarriers comprises:
means for performing transmit steering for each of the multiple subcarriers with the transmit steering matrix determined for the subcarrier.

14. A memory apparatus including instructions stored thereon, comprising:
a first instruction set for receiving channel information for at least one subcarrier that is a subset of multiple subcarriers used for data transmission;
a second instruction set for obtaining transmit steering matrices for the multiple subcarriers based on the channel information for the at least one subcarrier, by obtaining at least one transmit steering matrix for the at least one subcarrier based on the channel information and determining a transmit steering matrix for each of the other multiple subcarriers based on the at least one transmit steering matrix by setting the transmit steering matrix for each of the other multiple subcarriers equal to a transmit steering matrix obtained for a closest one of the at least one subcarrier; and
a third instruction set for processing data for the multiple subcarriers with the transmit steering matrices to send the data from multiple transmit antennas to multiple receive antennas.

* * * * *